UNITED STATES PATENT OFFICE.

CHARLES B. THWING, OF GALESBURG, ILLINOIS.

SOLDER FOR ALUMINIUM OR OTHER METALS.

SPECIFICATION forming part of Letters Patent No. 638,855, dated December 12, 1899.

Application filed April 17, 1899. Serial No. 713,395. (No specimens.)

*To all whom it may concern:*

Be it known that I, CHARLES B. THWING, a citizen of the United States, residing at Galesburg, in the county of Knox and State of Illinois, have invented certain new and useful Improvements in Solder for Aluminium or other Metals; and I do hereby declare the following to be a full, clear, and exact description of the invention, such as will enable others skilled in the art to which it appertains to make and use the same.

My invention relates to a solder for soldering metals, as aluminium, brass, copper, nickel, &c.; but it is more especially adapted for use in soldering the metal aluminium to itself or to other metals.

It is very desirable that a solder for aluminium should melt at a low temperature, should adhere readily and permanently to the aluminium, and form a smooth white surface which will not discolor or disintegrate when exposed to water or to air containing moisture. I have found that an alloy of tin, zinc, and bismuth, and particularly one in which the tin is in excess of the other metals, meets these requirements in a very high degree. I prefer to use thirty per centum or less of zinc, five per centum or less of bismuth, and sixty-five per centum or more of tin. I do not, however, limit myself to these proportions, as other proportions may be employed.

My solder works well on brass, copper, nickel, iron, and other metals with zinc chlorid as a flux.

My solder is made, preferably, by melting the ingredients together in the desired proportions, and it may be applied to the metals to be joined in any known or preferred manner.

I claim—

1. As a solder for aluminium and other metals, an alloy of tin, bismuth, and zinc.

2. As a solder for aluminium and other metals, an alloy of tin, bismuth, and zinc, the tin being considerably in excess of the other metals.

In testimony whereof I affix my signature in presence of two witnesses.

CHARLES B. THWING.

Witnesses:
FRED G. HOLLOWAY,
FRANK WENNER.